United States Patent
LeBeau (10) Patent No.: US 12,085,114 B2
(45) Date of Patent: Sep. 10, 2024

(54) MULTIFUNCTION CARABINER

(71) Applicant: LeBeau Inc., Logan, UT (US)

(72) Inventor: Mark William LeBeau, Logan, UT (US)

(73) Assignee: LeBeau Inc., Logan, UT (US)

( * ) Notice: Subject to any disclaimer, the term of this patent is extended or adjusted under 35 U.S.C. 154(b) by 604 days.

(21) Appl. No.: 17/225,401

(22) Filed: Apr. 8, 2021

(65) Prior Publication Data

US 2021/0317866 A1 Oct. 14, 2021

Related U.S. Application Data

(60) Provisional application No. 63/007,309, filed on Apr. 8, 2020.

(51) Int. Cl.
*F16B 45/02* (2006.01)
*A63B 29/02* (2006.01)
*F16D 63/00* (2006.01)

(52) U.S. Cl.
CPC ............ *F16B 45/027* (2021.05); *A63B 29/02* (2013.01); *F16D 63/008* (2013.01)

(58) Field of Classification Search
CPC .... F16B 45/027; F16B 45/023; F16B 45/024; F16D 63/008; A63B 29/02; A63B 1/06
See application file for complete search history.

(56) References Cited

U.S. PATENT DOCUMENTS

| | | | | |
|---|---|---|---|---|
| D625,988 S | * | 10/2010 | Chan | D8/367 |
| D662,399 S | * | 6/2012 | Kope | D8/367 |
| D902,009 S | * | 11/2020 | Yang | D8/356 |
| D931,715 S | * | 9/2021 | Hung | D8/356 |
| D934,060 S | * | 10/2021 | Petzl | D8/356 |
| 2012/0011688 A1 | * | 1/2012 | Yang | F16B 45/027 24/599.6 |
| 2014/0123447 A1 | * | 5/2014 | Calvert | F16B 45/023 24/599.9 |
| 2018/0347665 A1 | * | 12/2018 | LeBeau | F16G 11/048 |
| 2021/0131481 A1 | * | 5/2021 | Walker | F16B 45/028 |

OTHER PUBLICATIONS

European Patent No. EP 3293405 to Hall published on Mar. 14, 2018.*

* cited by examiner

*Primary Examiner* — Pamela Rodriguez
(74) *Attorney, Agent, or Firm* — Seth Black; Black IP, PLLC (57) ABSTRACT

The present invention extends to a carabiner intended for use as an adjustable anchor or a belay device. In general, implementations include a carabiner that includes a frame defining a hole and a gate. More specifically, implementations include a carabiner having a spine with an elongated slot portion having a first slot wall and a second slot wall that define a hole through the spine of the frame. Additionally, some implementations include a carabiner kit with a first carabiner having an elongated slot portion on the spine, a second carabiner, a pinching mechanism formed by linking the first and second carabiners together, and a rope that goes through the elongated slot portion, around the second carabiner, and back out the elongated slot portion of the first carabiner to enable the pinching mechanism to selectively pinch the rope for use as an adjustable anchor or a belay device.

20 Claims, 10 Drawing Sheets

MULTIFUNCTION CARABINER

CROSS-REFERENCE TO RELATED APPLICATIONS

This application claims the benefit of, and priority to, U.S. Provisional Patent Application Ser. No. 63/007,309, entitled "MULTIFUNCTION CARABINER," filed Apr. 8, 2020 by Mark William LeBeau, the entire contents of which are hereby expressly incorporated by reference.

BACKGROUND

1. Field of the Invention

The invention relates to the field of climbing and, more particularly, it relates to a multifunction carabiner having an elongated slot portion which enables the carabiner to be used to form a pinching mechanism to provide an adjustable anchor or a belay device for a climber.

2. Background and Relevant Art

A carabiner is a specialized type of shackle usually made from a metal, such as steel or aluminum. In general, a carabiner includes a frame and a gate that selectively opens and closes to form a complete loop. More particularly, the gate is typically pivotally connected to one end of the frame and selectively engages a nose at another end of the frame to form the loop. Additionally, the gate is usually spring-loaded, biased toward closing the loop. In some cases, a gate may include an optional locking sleeve which locks the gate in the closed position to secure the complete loop. Typically, the frame of a carabiner further includes a spine that connects to both a basket of the frame and a crotch of the frame that is opposite the basket. Oftentimes rope, cord, or webbing is threaded through either the basket or the crotch or both. Moreover, a carabiner can take a variety of shapes, such as oval shaped, regular D-shaped, asymmetrical D-shaped, and pear shaped, among others.

Thus, in light of their specific shape and components, carabiners are widely used in rope-intensive activities such as climbing, arboriculture, caving, sailing, hot air ballooning, rope rescue, construction, industrial rope work, window cleaning, whitewater rescue, and acrobatics. Oftentimes, such rope-intensive activities require a climber to anchor to various support surfaces. This typically involves a climber connecting a climbing harness to an anchor secured to a support surface. For example, it is frequently the case that a rock climber connects their harness to a climbing surface by forming an anchor using multiple devices, such as a carabiner and a sling or a piece of rope. In some cases, a climber may form an anchor that includes two carabiners and a daisy chain.

Accordingly, one problem with conventional carabiners is that multiple other devices, such as additional carabiners, rope, slings, or daisy chains are needed to form a safe anchor to a support surface. Consequently, this requires climbers to carry more equipment than may be ideal.

Additionally, another problem with conventional carabiners is that anchors formed using such carabiners are not easily and finely adjustable. For example, the length of the anchor formed using two carabiners and a daisy chain can only be adjusted in increments that correspond to the size of the loops in the daisy chain. As another example, the knots required to build an anchor formed using two carabiners and a rope may be too complex and challenging to replicate in emergency situations. In other words, anchors formed from conventional carabiners are typically either not finely adjustable or too difficult to recreate.

Moreover, yet another problem is that some conventional carabiners include additional moving parts above and beyond a gate that opens and closes. For example, some conventional carabiners include slidable pins, rotatable cams, pivotable blocks, or other mechanical moving parts that are unreliable or otherwise unpredictable when using such carabiners as an adjustable anchor or belay device.

In view of problems such as those noted above, and others, it would be useful to provide a multifunction carabiner that can be used as an anchor without the necessity for an unduly burdensome number of additional devices. Moreover, it would be useful to provide a multifunction carabiner that can serve as a more easily and finely adjustable anchor that does not require complex knots. Furthermore, it would be useful to provide a multifunction carabiner that can serve as both an anchor and a belay device, depending on the context, but which lacks additional mechanical moving parts above and beyond a gate that opens and closes. Therefore, conventional carabiners have various limitations that are desirable to overcome.

BRIEF SUMMARY

The present invention extends to a carabiner having a frame defining a hole therethrough and a gate pivotally connected to the frame. In one aspect, a carabiner includes a spine, the spine defining a hole (e.g., a slot) therethrough and a gate pivotally connected to the frame, the gate movable between a closed position and an open position.

In another aspect, a carabiner includes a frame having a spine, the spine having an elongated solid portion and an elongated slot portion defining a hole (e.g., a slot) through the spine of the frame. In this aspect, the carabiner also includes a gate pivotally connected to the frame, the gate movable between a closed position and an open position.

In yet another aspect, a carabiner includes a frame having a spine, the spine having an elongated solid portion and an elongated slot portion, the elongated slot portion having a first slot wall and a second slot wall, such that the first slot wall and the second slot wall of the elongated slot portion define a hole (e.g., a slot) through the spine of the frame. In this aspect, the carabiner again includes a gate pivotally connected to the frame, the gate movable between a closed position and an open position.

In an additional aspect, a carabiner kit includes a first carabiner, a second carabiner, a pinching mechanism, and a rope. In this aspect, the first carabiner includes a frame having a spine, the spine having an elongated solid portion and an elongated slot portion defining a hole (e.g., a slot) through the spine of the frame. The first carabiner also includes a gate pivotally connected to the frame, the gate movable between a closed position and an open position. This second carabiner also includes a frame and a gate pivotally connected to the frame, the gate movable between a closed position and an open position. Moreover, in this aspect, the pinching mechanism is formed by linking the second carabiner around the first carabiner, the pinching mechanism movable between a pinched position and an unpinched position. This aspect further includes a rope passing into the elongated slot portion of the first carabiner, around the frame of the second carabiner, and then back out of the elongated slot portion of the first carabiner. In this aspect, the rope is configured to be pinched between the frame of the first carabiner and the frame of the second carabiner when the pinching mechanism is in the pinched position and the rope is configured to be unpinched between the frame of the first carabiner and the frame of the second carabiner when the pinching mechanism is in the unpinched position. In at least one alternative aspect, the frame of the first carabiner includes a frame surface positioned on the crotch of the first carabiner. For example, the frame surface can comprise a protrusion or a textured surface, such as one or more knurls. Also, in at least one alternative aspect, the rope further includes a first portion having an end that prevents the rope from traveling completely through the elongated slot portion of the first carabiner (e.g., a loop, knot, etc.) and a second portion having an end that prevents the rope from traveling completely through the elongated slot portion of the first carabiner (e.g., a loop, knot, etc.). Furthermore, in at least one alternative aspect, the pinching mechanism moves toward the pinched position when force is applied to the rope in a direction that forces the rope and the second carabiner towards the frame of the first carabiner (e.g., towards a crotch of the frame of the first carabiner) and the pinching mechanism moves toward the unpinched position when force is applied to the rope in a direction that forces the rope and the second carabiner away from the frame of the first carabiner (e.g., away from a crotch of the frame of the first carabiner).

In yet a further aspect, the carabiner kit can be configured to for use as an adjustable anchor or a belay device.

This Brief Summary is provided to introduce a selection of concepts in a simplified form that are further described below in the Detailed Description. This Brief Summary is not intended to identify key features or essential features of the claimed subject matter, nor is it intended to be used as an aid in determining the scope of the claimed subject matter.

Additional aspects, features, and advantages will be set forth in the Detailed Description which follows, and in part will be obvious from the Detailed Description, or may be learned by practice. The aspects, features, and advantages may be realized and obtained by means of the instruments and combinations particularly pointed out in the appended claims. These and other aspects, features, and advantages will become more fully apparent from the following Detailed Description and appended claims, or may be learned by practice as set forth hereinafter.

BRIEF DESCRIPTION OF THE DRAWINGS

In order to describe the manner in which the above-recited and other aspects, features, and advantages can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Examples extend to a carabiner. In one aspect, the carabiner is used as an adjustable anchor to connect to a support surface. More specifically, the carabiner can secure a climber by connecting the climber, such as on their harness, to the support surface, such as on a bolt permanently secured to a rock wall. In another aspect, the carabiner is used as a belay device. More specifically, the carabiner can be used by a first climber to belay a second climber. In yet another aspect, the carabiner is a single, standalone device that can be used, with the addition of another carabiner and a rope, to build an adjustable anchor or a belay device, thereby reducing the amount of equipment the climber needs to carry. In an additional aspect, the carabiner, when used in combination with another carabiner and a rope, provides an anchor that is easily and finely adjustable in length or distance between the climber and the support surface.

In one implementation, a carabiner includes a frame having a spine defining a hole (e.g., a slot) through the spine, as well as a gate pivotally connected to the frame, the gate movable between a closed position and an open position.

In a more specific implementation, a carabiner includes a frame having a spine, the spine including an elongated solid portion and an elongated slot portion defining a hole (e.g., a slot) through the spine of the frame. This implementation can further include a gate pivotally connected to the frame, the gate movable between a closed position and an open position.

In an additional specific implementation, a carabiner includes a frame having a spine, the spine including an elongated solid portion and an elongated slot portion, the elongated slot portion including a first slot wall and a second slot wall, wherein the first slot wall and the second slot wall of the elongated slot portion define a hole (e.g., a slot) through the spine of the frame. This implementation can further include a gate pivotally connected to the frame, the gate movable between a closed position and an open position. Moreover, this implementation can further include the frame having a nose that mates with the gate in the closed position, a basket adjacent to the nose, the basket substantially perpendicular to the gate in the closed position, the spine adjacent to the basket, the spine opposite the gate in the closed position, a crotch adjacent to the spine, the crotch opposite the basket, and a gate pivot head that protrudes from the crotch to pivotally connect to the gate using a gate pivot rod. Furthermore, this implementation can further include the gate having a locking sleeve.

In yet an additional implementation, a carabiner kit includes a first carabiner, a second carabiner, a pinching mechanism, and a rope. In this implementation, the first carabiner includes a frame having a spine, the spine including an elongated solid portion and an elongated slot portion defining a hole (e.g., a slot) through the spine of the frame.

This implementation also includes the second carabiner having a frame. Similarly, in this implementation both the first carabiner and the second carabiner further include a gate pivotally connected to the frame, the gate movable between a closed position and an open position. Moreover, in this implementation the pinching mechanism is formed by linking the second carabiner around the first carabiner, such that the pinching mechanism is movable between a pinched position and an unpinched position. Furthermore, in this implementation the rope passes through the elongated slot portion of the first carabiner, around the frame of the second carabiner, and back out of the elongated slot portion of the first carabiner, the rope configured to be pinched between the frame of the first carabiner and the frame of the second carabiner when the pinching mechanism is in the pinched position and the rope configured to be unpinched between the frame of the first carabiner and the frame of the second carabiner when the pinching mechanism is in the unpinched position. Additionally, the rope of this implementation can include a first portion having an end that prevents the rope from traveling completely through the elongated slot portion and a second portion having an end that prevents the rope from traveling completely through the elongated slot portion. Also, in this implementation the pinching mechanism moves toward the pinched position when force is applied to the rope in a direction that forces the rope and the second carabiner towards the frame of the first carabiner (e.g., towards a crotch of the frame of the first carabiner) and, in contrast, the pinching mechanism moves toward the unpinched position when force is applied to the rope in a direction that forces the rope and the second carabiner away from the frame of the first carabiner (e.g., away from a crotch of the frame of the first carabiner).

Furthermore, one or more implementations can further include a frame surface positioned on the crotch of the first carabiner, which aids in forming the pinching mechanism and establishing the pinching position. For example, one or more implementations can include the frame surface including a protrusion or a textured surface, such as one or more knurls, that increases friction to facilitate forming the pinching mechanism and establishing the pinching position.

With respect to FIGS. 1-10, various aspects, features, and advantages of various implementations are depicted.

Figure 1:
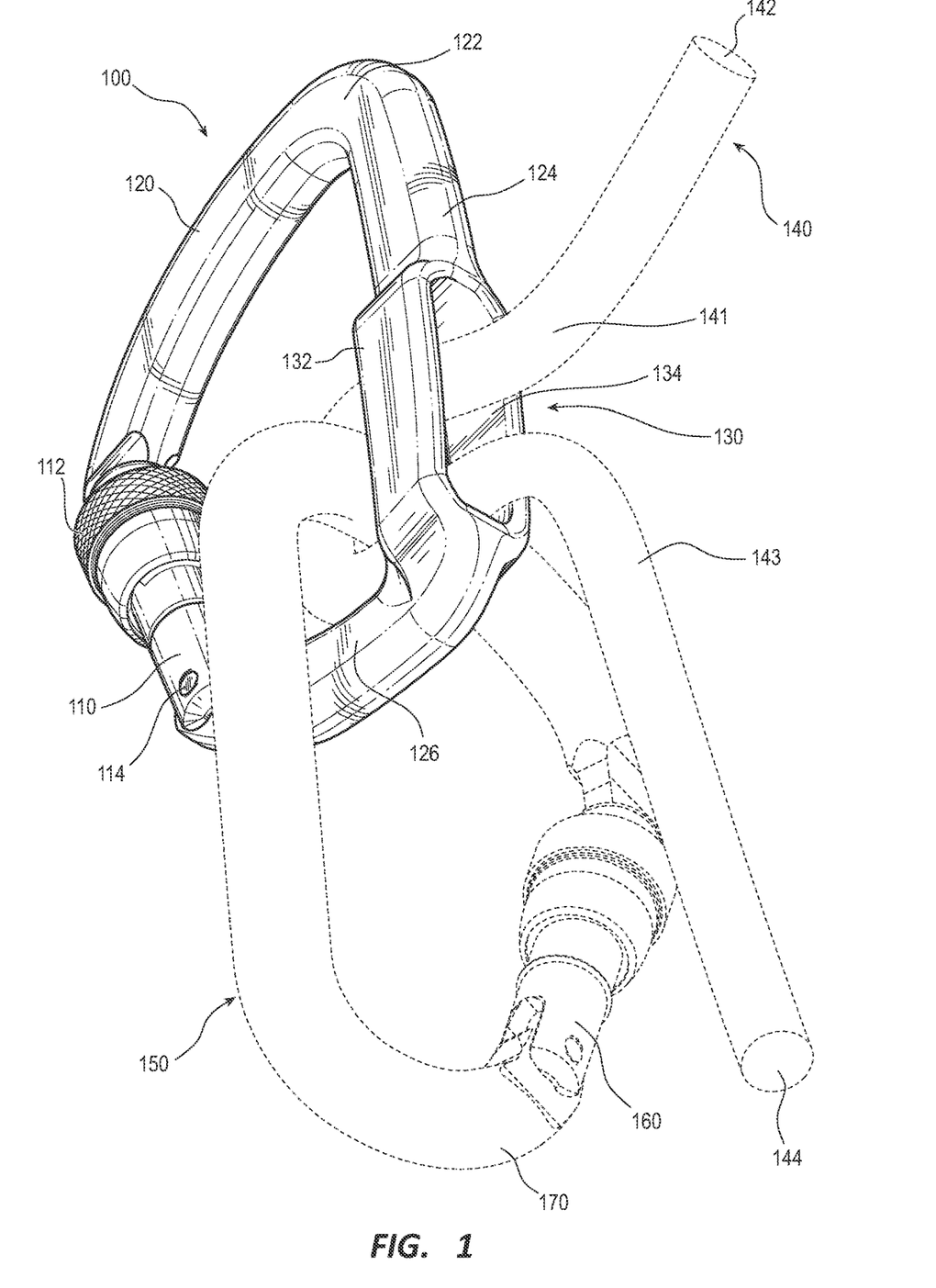
FIG. 1 illustrates a perspective view of an example carabiner kit.

Turning to FIG. 1, an example carabiner kit is depicted. The carabiner kit includes a first carabiner 100 which further includes a gate 110, a frame 120 having an elongated slot portion 130, a rope 140, and a second carabiner 150 having a gate 160 and frame 170. In FIG. 1, gate 110 is pivotally connected to frame 120 at a gate pivot head using gate pivot rod 114. Gate 110 further includes a locking sleeve 112. In FIG. 1, gate 110 is shown in a closed position which creates a continuous loop formed by gate 110 and frame 120. However, gate 110 can pivot to an open position which enables the carabiner to be hooked or attached to another device (e.g., a carabiner, rope, or harness, etc.) or a support surface (e.g., permanent bolt on a rock wall, etc.).

FIG. 1 further illustrates frame 120 includes a basket 122, a spine 124, and a crotch 126. Basket 122 is adjacent to spine 124 and a nose of the frame 120. Spine 124 is adjacent to basket 122 and crotch 126. Crotch 126 is adjacent to a gate pivot head of frame 120 which protrudes to create a hinge with gate 110. The nose of frame 120 engages or mates with gate 110 when in the closed position. Additionally, locking sleeve 112 screws over the nose of frame 120 and an end of gate 110 to secure gate 110 in the closed position.

FIG. 1 also illustrates frame 120 includes elongated slot portion 130. More specifically, elongated slot portion 130 further includes first slot wall 132 and second slot wall 134. Elongated slot portion 130 with first slot wall 132 and second slot wall 134 form a hole (e.g., a slot) in the spine 124 of first carabiner 100. Thus, spine 124 of frame 120 includes a first portion of spine 124 generally indicated by 124 (i.e., an elongated solid portion) and a second portion of spine 124 generally indicated by 130 (i.e., elongated slot portion 130).

Figure 3:
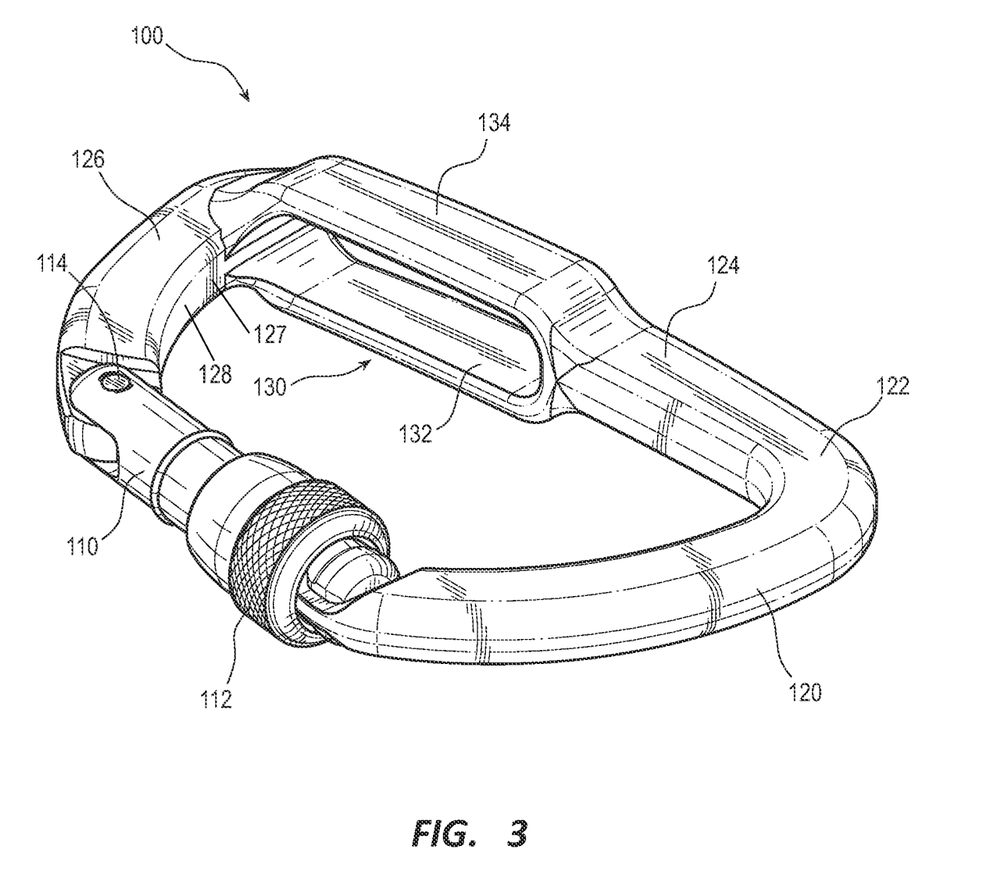
FIG. 3 illustrates a top, rear, left side perspective view of the example carabiner from the carabiner kit of FIG. 1.

FIG. 1 also illustrates a pinching mechanism formed by first carabiner 100 linking with second carabiner 150 proximate crotch 126 of frame 120 of carabiner 100. The pinching mechanism is further formed by the addition of rope 140 which enters elongated slot portion 130 of frame 120 of first carabiner 100, wraps around frame 170 of second carabiner 150, ultimately exiting elongated slot portion 130. Frame 120 of first carabiner 100 can provide a frame surface (e.g., a protrusion 127 or a textured surface, such as one or more knurls 128 as shown in FIG. 3) that is proximate the pinching mechanism (e.g., on crotch 126 for first carabiner 100), and thereby provides a surface against which the pinching mechanism can selectively pinch rope 140. Thus, in one or more implementations, the pinching mechanism pinches the rope 140 against or between both a surface of frame 120 of first carabiner 100 and a surface of frame 170 of second carabiner 150.

FIG. 1 further illustrates rope 140 includes a first portion 141 having an end 142 and a second portion 143 having an end 144. The ends 142 and 144 can be formed to prevent the rope 140 from passing entirely through elongated slot portion 130 and falling out of the first carabiner 100. Furthermore, end 142 can be attached to a climber by forming a girth hitch using a loop of end 142 and a portion of first portion 141, such as by forming the girth hitch on the belay loop of the climber's climbing harness. In some implementations, end 142 and end 144 can take other forms, such as a loop, an enlarged portion formed by doubling the rope back on itself, a knot, or an unmodified free end of rope that is the same thickness as the rest of rope 140 as shown by FIG. 1. In general, rope 140 can be any length. However, a length of between two feet and six feet is desirable and, more specifically, in most cases a length of about three feet is ideal. Moreover, while FIG. 1 shows rope 140 as a line having two ends, in other implementations, rope 140 can be a continuous loop of rope lacking any ends. In such other implementations, rope 140 can further include another loop within the continuous loop of rope which can be used to connect to a climbing harness (e.g., two or more continuous loops of rope linked together).

FIG. 1 also illustrates rope 140 can freely travel through elongated slot portion 130 of carabiner 100 between the pinching mechanism formed by first carabiner 100 and second carabiner 150 when in the unpinched position. Accordingly, the length of first portion 141 of rope 140 can be adjusted by selecting a different pinch point along the length of rope 140. For example, the length of first portion 141 can be elongated by pulling first portion 141, thereby shortening second portion 143. Conversely, the length of first portion 141 can be shortened by pulling second portion 143, thereby elongating second portion 143. Once the desired length of first portion 141 is selected, the pinching mechanism formed by first carabiner 100 and second carabiner 150 can be engaged to pinch the rope 140 in a fixed position such that first carabiner 100, second carabiner 150, and rope 140 can be used as an adjustable anchor or a belay device.

Figure 2:
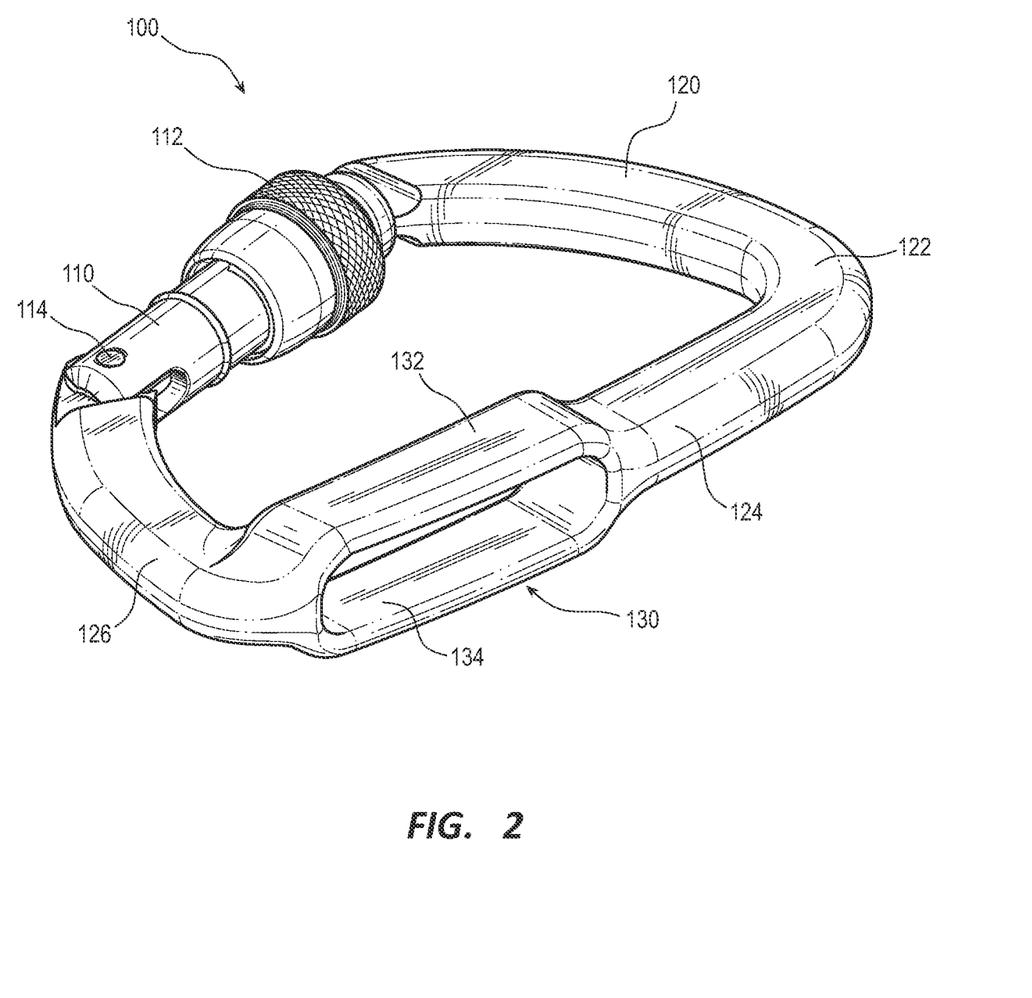
FIG. 2 illustrates a bottom, front, right side perspective view of an example carabiner from the carabiner kit of FIG. 1.
Figure 4:
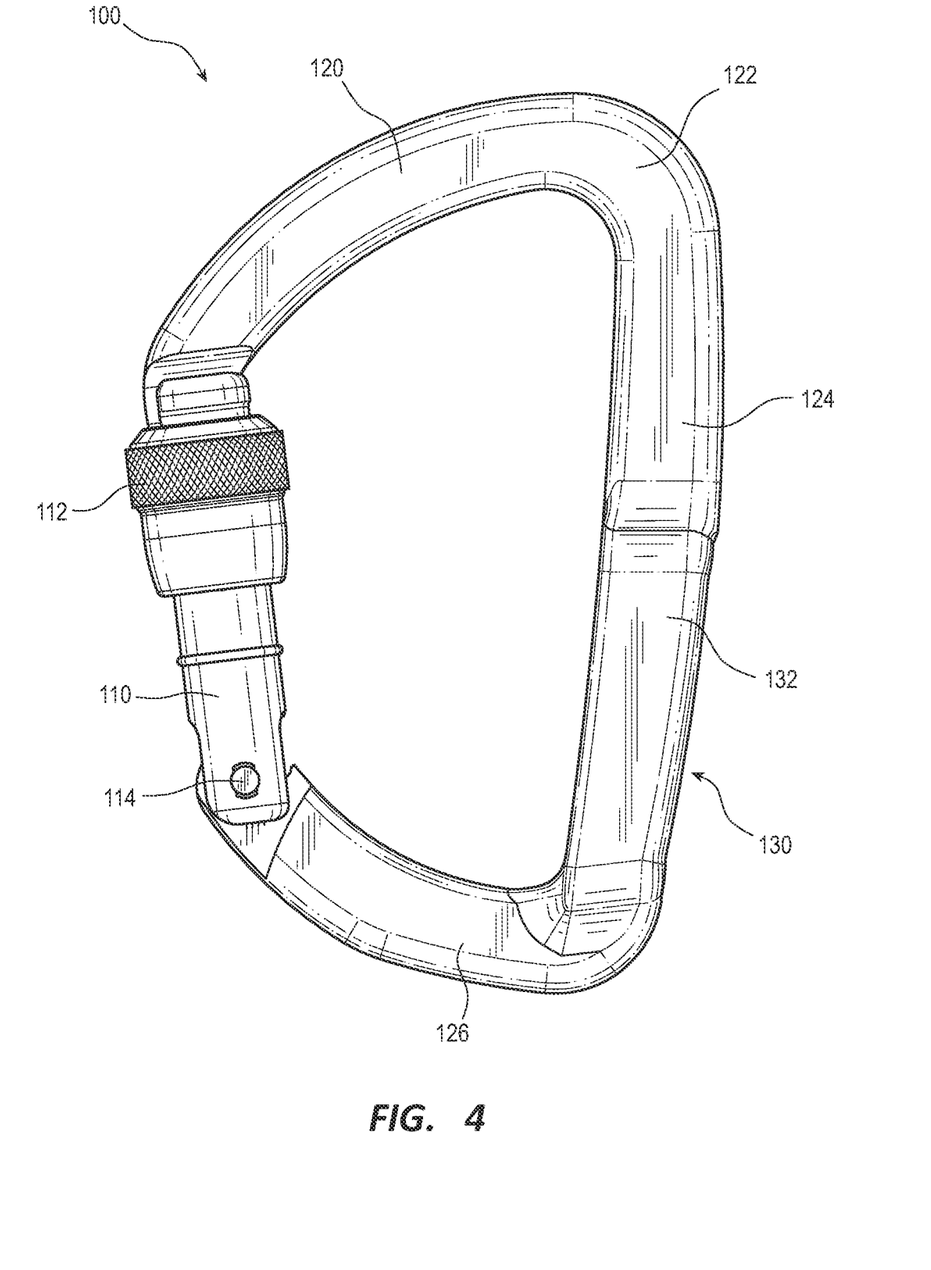
FIG. 4 illustrates a front elevational view of the example carabiner from the carabiner kit of FIG. 1.
Figure 5:
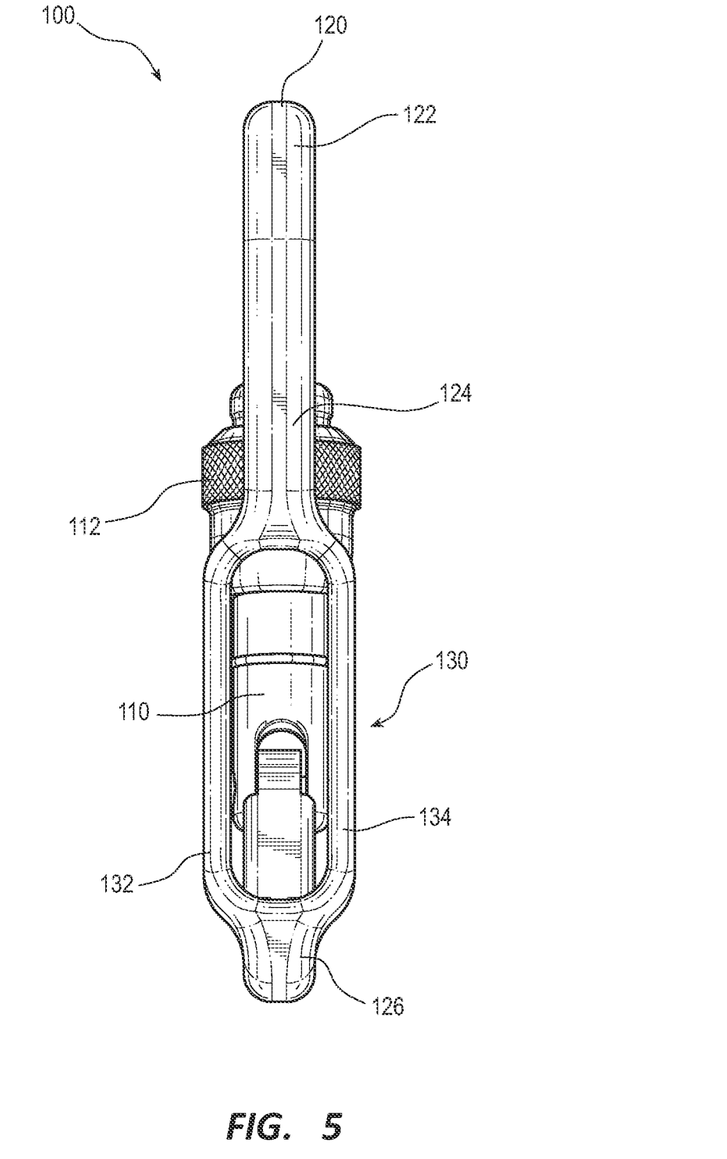
FIG. 5 illustrates a right side elevational view of the example carabiner from the carabiner kit of FIG. 1.
Figure 6:
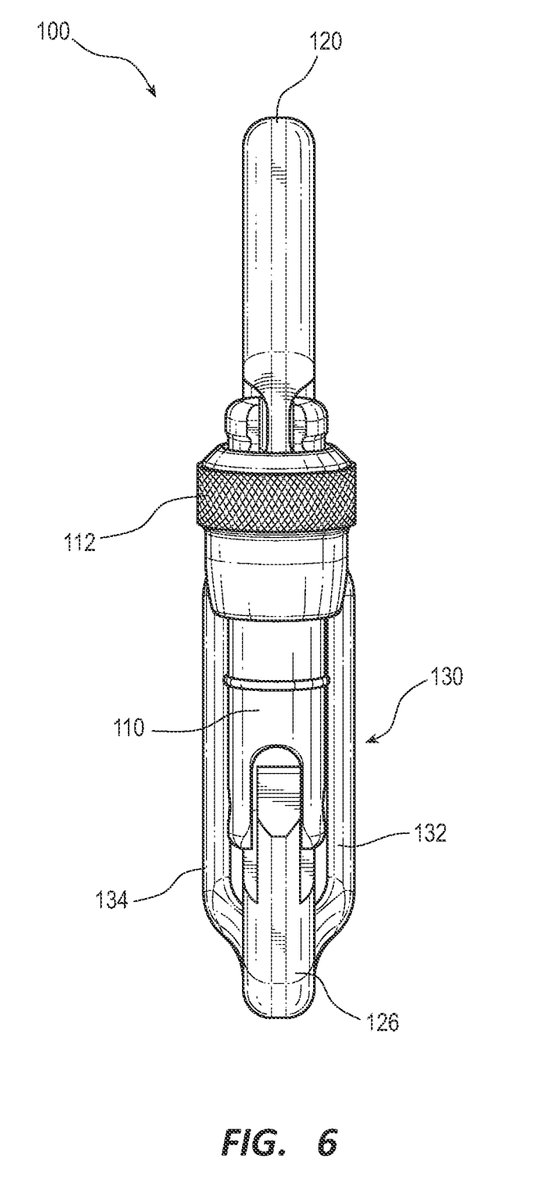
FIG. 6 illustrates a left side elevational view of the example carabiner from the carabiner kit of FIG. 1.
Figure 7:
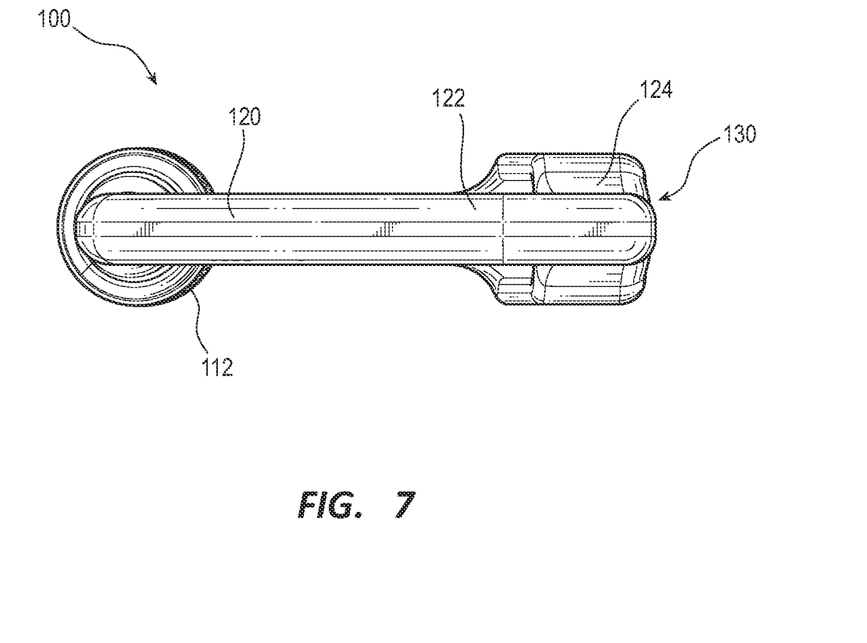
FIG. 7 illustrates a top plan view of the example carabiner from the carabiner kit of FIG. 1.
Figure 8:
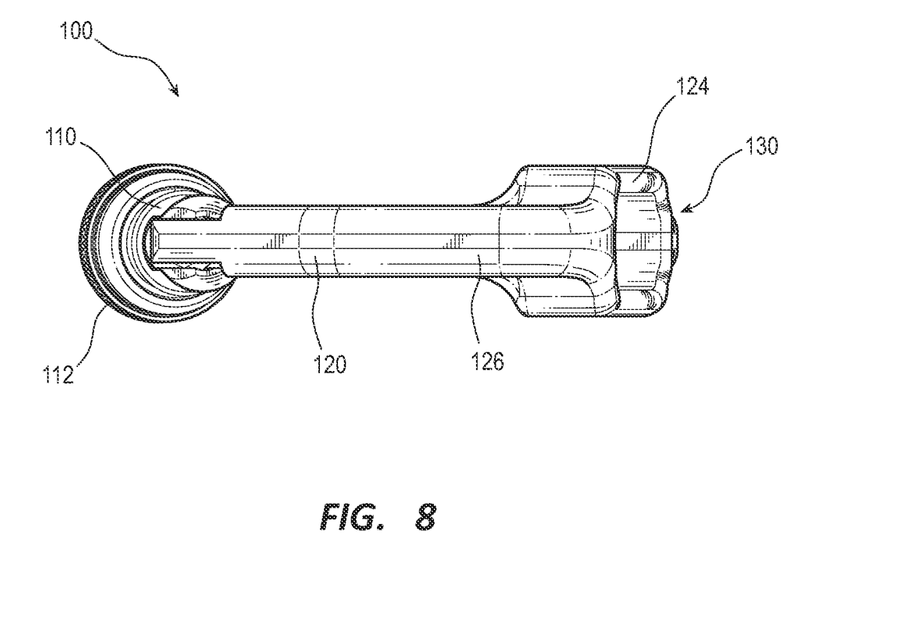
FIG. 8 illustrates a bottom plan view of the example carabiner from the carabiner kit of FIG. 1.

Turning to FIGS. 2-8, additional views of first carabiner 100 are depicted. FIG. 2 illustrates a bottom, front, right side perspective view of first carabiner 100. More specifically, FIG. 2 shows first carabiner 100 includes gate 110 having locking sleeve 112 and gate pivot rod 114, frame 120 having basket 122, spine 124, and crotch 126, with spine 124 further including an elongated solid portion generally indicated by 124 and an elongated slot portion 130 having first slot wall 132 and second slot wall 134 that defines a hole (e.g., a slot) in spine 124 of first carabiner 100. FIG. 3 illustrates a top, rear, left side perspective view of first carabiner 100. In particular, FIG. 3 shows first carabiner 100 includes gate 110 having locking sleeve 112 and gate pivot rod 114, frame 120 having basket 122, spine 124, and crotch 126 having protrusion 127 and a textured surface, such as one or more knurls 128, with spine 124 further including an elongated solid portion generally indicated by 124 and an elongated slot portion 130 having first slot wall 132 and second slot wall 134 that defines a hole (e.g., a slot) in spine 124 of first carabiner 100. FIG. 4 illustrates a front elevational view of first carabiner 100. More specifically, FIG. 4 shows first carabiner 100 includes gate 110 having locking sleeve 112 and gate pivot rod 114, frame 120 having basket 122, spine 124, and crotch 126, with spine 124 further including an elongated solid portion generally indicated by 124 and an elongated slot portion 130 having first slot wall 132. FIG. 5 illustrates a right side elevational view of first carabiner 100. In particular, FIG. 5 shows first carabiner 100 includes gate 110 having locking sleeve 112, frame 120 having basket 122, spine 124, and crotch 126, with spine 124 further including an elongated solid portion generally indicated by 124 and an elongated slot portion 130 having first slot wall 132 and second slot wall 134 that defines a hole (e.g., a slot) in spine 124 of first carabiner 100. FIG. 6 illustrates a left side elevational view of first carabiner 100. More specifically, FIG. 6 shows first carabiner 100 includes gate 110 having locking sleeve 112, frame 120 having crotch 126 and further including an elongated slot portion 130 having first slot wall 132 and second slot wall 134. FIG. 7 illustrates a top plan view of first carabiner 100. In particular, FIG. 7 shows first carabiner 100 includes locking sleeve 112, frame 120 having basket 122, spine 124, with spine 124 further including an elongated solid portion generally indicated by 124 and an elongated slot portion 130. FIG. 8 illustrates a bottom plan view of first carabiner 100. More specifically, FIG. 8 shows first carabiner 100 includes gate 110 with locking sleeve 112, frame 120 having spine 124 and crotch 126, with spine 124 further including an elongated solid portion generally indicated by 124 and an elongated slot portion 130.

Figure 9:
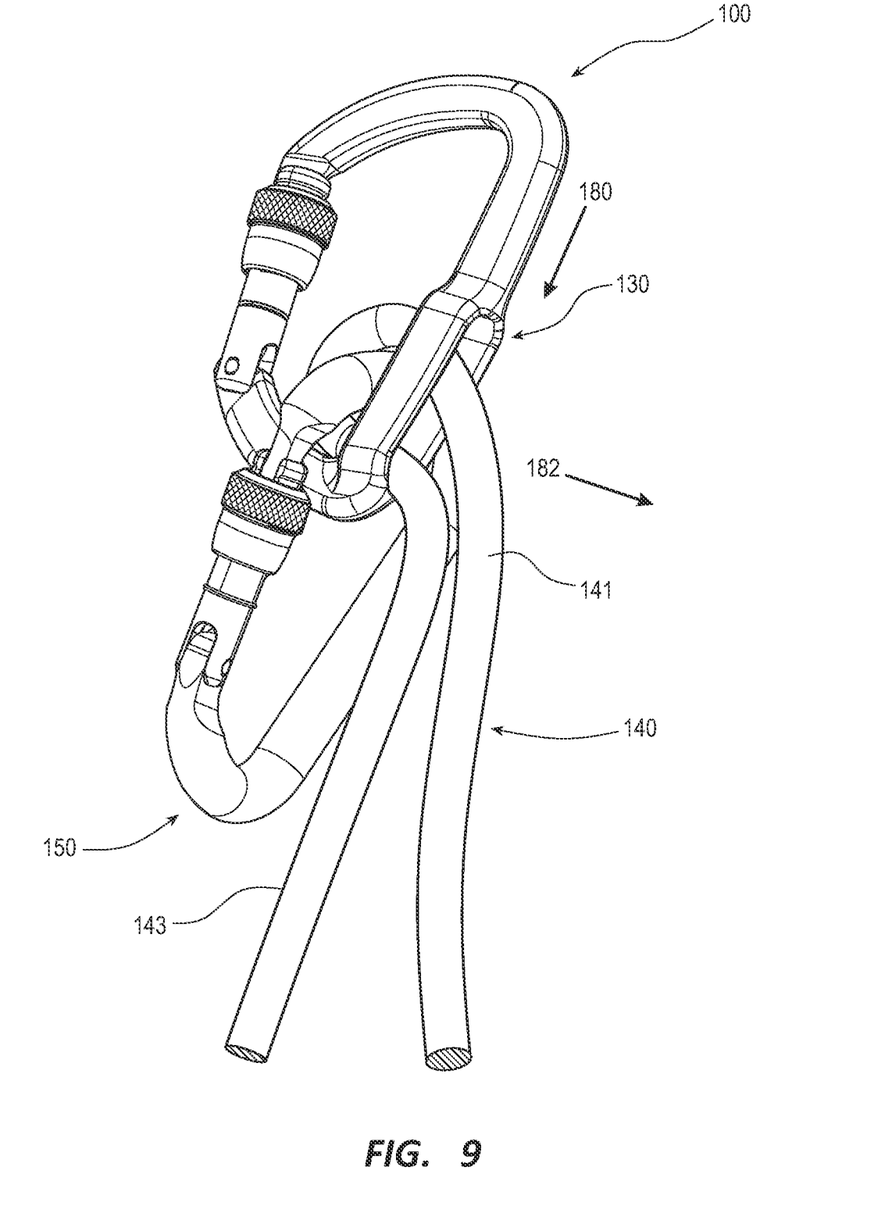
FIG. 9 illustrates the example carabiner kit of FIG. 1 shown configured for use as an adjustable anchor.

Turning to FIG. 9, an example of carabiner kit from FIG. 1 is shown configured for use as an adjustable anchor. The carabiner kit includes first carabiner 100 having an elongated slot portion 130, second carabiner 150, and rope 140 having first portion 141 and second portion 143. First carabiner 100 and second carabiner 150 are linked together and rope 140 is wrapped around second carabiner 150 through elongated slot portion 130, with rope 140 entering and exiting elongated slot portion 130 of first carabiner 100. More specifically, FIG. 9 illustrates the carabiner kit forming a pinching mechanism in the pinched position. To create the pinched position a force is applied to rope 140 at first portion 141 generally in direction 180 (i.e., towards the frame of first carabiner 100). By applying a force on first portion 141 of rope 140 in direction 180 second portion 143 of rope 140 is pinched at the crotch of first carabiner 100 between first carabiner 100 and second carabiner 150. To create the unpinched position a force is applied to rope 140 at first portion 141 generally in direction 182 (i.e., away from the frame of first carabiner 100), thereby relieving the pinching against second portion 143 of rope 140, and allowing the rope 140 to move freely through the elongated slot portion 130 and around second carabiner 150. In some implementations, creating the pinched position may require weighting rope 140 from first portion 141 generally in a direction parallel to the spine of first carabiner 100 and towards the frame of first carabiner 100 (e.g. direction 180 forcing rope 140 and second carabiner 150 towards the frame of first carabiner 100), whereas creating the unpinched position may require unweighting rope 140 from the first portion 141 generally in a direction away from the frame of first carabiner 100 (e.g. direction 182 releasing rope 140 and second carabiner 150 away from the frame of first carabiner 100, or alternatively, in a direction opposite direction 180, such as towards the basket of the frame of first carabiner 100).

Figure 10:
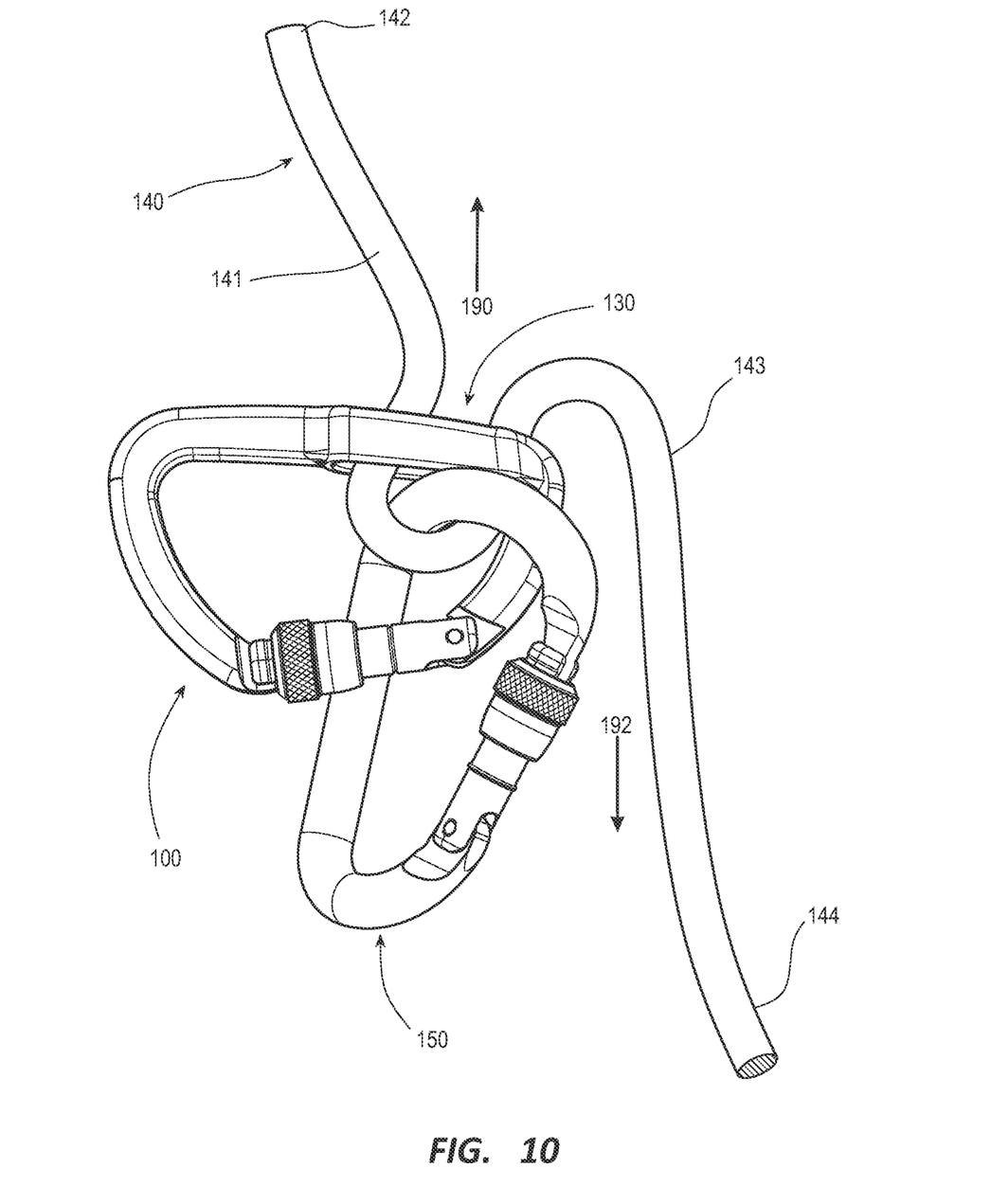
FIG. 10 illustrates the example carabiner kit of FIG. 1 shown configured for use as a belay device.

Turning to FIG. 10, an example carabiner kit from FIG. 1 is shown configured for use as a belay device. The carabiner kit includes first carabiner 100 having an elongated slot portion 130, second carabiner 150, and rope 140 having first portion 141 and second portion 143. First carabiner 100 and second carabiner 150 are linked together and rope 140 is wrapped around second carabiner 150 through elongated slot portion 130, with rope 140 entering and exiting elongated slot portion 130 of first carabiner 100. First portion 141 of rope 140 can be connected to a first climber being belayed near end 142. A second climber who is belaying can feed second portion 143 of rope 140 through the pinching mechanism in an unpinched position formed by first carabiner 100 and second carabiner 150 as the first climber ascends generally in direction 190. Alternatively, the second climber who is belaying can pinch the rope 140 through the pinching mechanism formed between first carabiner 100 and second carabiner 150 by applying a force to second portion 143 of rope 140 generally in direction 192, thereby forcing rope 140 to be pinched between first carabiner 100 and second carabiner 150.

The present invention may be implemented in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A carabiner comprising:
    a frame having an interior side, an exterior side, and a spine, the spine comprising:
        an elongated slot portion, the elongated slot portion comprising:
            a first slot wall; and
            a second slot wall;
            wherein the first slot wall and the second slot wall of the elongated slot portion define a hole through the spine of the frame to allow access between the interior side of the frame and the exterior side of the frame through the hole; and
    a gate pivotally connected to the frame, the gate movable between a closed position and an open position.

2. The carabiner of claim 1, wherein the frame comprises:
    a nose that mates with the gate in the closed position;
    a basket adjacent to the nose, the basket substantially perpendicular to the gate in the closed position;
    the spine adjacent to the basket, the spine opposite the gate in the closed position;

a crotch adjacent to the spine, the crotch opposite the basket; and a gate pivot head that protrudes from the crotch to pivotally connect to the gate using a gate pivot rod.

3. The carabiner of claim 1, wherein the frame comprises a frame surface positioned on a crotch of the carabiner.

4. The carabiner of claim 3, wherein the frame surface comprises a protrusion.

5. The carabiner of claim 3, wherein the frame surface comprises one or more knurls.

6. The carabiner of claim 1, wherein the gate further comprises a locking sleeve.

7. The carabiner of claim 1, wherein the spine further comprises an elongated solid portion.

8. A carabiner comprising:
a frame having an interior side, an exterior side, and a spine, the spine comprising:
an elongated solid portion; and
an elongated slot portion, the elongated slot portion comprising:
a first slot wall; and
a second slot wall;
wherein the first slot wall and the second slot wall of the elongated slot portion define a hole through the spine of the frame to allow access between the interior side of the frame and the exterior side of the frame through the hole; and
a gate pivotally connected to the frame, the gate movable between a closed position and an open position.

9. The carabiner of claim 8, wherein the frame comprises:
a nose that mates with the gate in the closed position;
a basket adjacent to the nose, the basket substantially perpendicular to the gate in the closed position;
the spine adjacent to the basket, the spine opposite the gate in the closed position;
a crotch adjacent to the spine, the crotch opposite the basket; and
a gate pivot head that protrudes from the crotch to pivotally connect to the gate using a gate pivot rod.

10. The carabiner of claim 9, wherein the frame comprises a frame surface positioned on the crotch of the carabiner.

11. The carabiner of claim 10, wherein the frame surface comprises a protrusion.

12. The carabiner of claim 10, wherein the frame surface comprises one or more knurls.

13. The carabiner of claim 11, wherein the gate further comprises a locking sleeve.

14. A carabiner kit comprising:
a first carabiner comprising:
a frame having a spine, the spine comprising:
an elongated slot portion, the elongated slot portion comprising:
a first slot wall; and
a second slot wall;
wherein the first slot wall and the second slot wall of the elongated slot portion define a hole through the spine of the frame; and
a gate pivotally connected to the frame, the gate movable between a closed position and an open position;
a second carabiner comprising:
a frame; and
a gate pivotally connected to the frame, the gate movable between a closed position and an open position;
a pinching mechanism formed by linking the second carabiner around the first carabiner, the pinching mechanism movable between a pinched position and an unpinched position; and
a rope passing into the elongated slot portion of the first carabiner, around the frame of the second carabiner, and out of the elongated slot portion, the rope configured to be pinched between the frame of the first carabiner and the frame of the second carabiner when the pinching mechanism is in the pinched position and the rope configured to be unpinched between the frame of the first carabiner and the frame of the second carabiner when the pinching mechanism is in the unpinched position.

15. The carabiner kit of claim 14:
wherein the pinching mechanism moves toward the pinched position when force is applied to the rope in a direction that forces the rope and the second carabiner towards the frame of the first carabiner; and
wherein the pinching mechanism moves toward the unpinched position when force is applied to the rope in a direction that forces the rope and the second carabiner away from the frame of the first carabiner.

16. The carabiner kit of claim 14, wherein the rope further comprises:
a first portion having an end that prevents the rope from traveling completely through the elongated slot portion; and
a second portion having an end that prevents the rope from traveling completely through the elongated slot portion.

17. The carabiner kit of claim 16, wherein the end of the first portion of the rope comprises a loop and the end of the second portion of the rope comprises a knot.

18. The carabiner kit of claim 14, wherein the rope comprises a continuous loop.

19. The carabiner kit of claim 14, wherein the frame of the first carabiner comprises a protrusion positioned on a crotch of the first carabiner.

20. The carabiner kit of claim 14, wherein the frame of the first carabiner comprises one or more knurls positioned on a crotch of the first carabiner.

* * * * *